United States Patent
Willis et al.

(10) Patent No.: US 6,455,651 B1
(45) Date of Patent: Sep. 24, 2002

(54) UNIFORM INITIATION OF ANIONIC POLYMERIZATION USING ORGANO-SUBSTITUTED ALKALI METAL INITIATORS

(75) Inventors: Carl Lesley Willis, Houston; Daniel Earl Goodwin, Katy, both of TX (US)

(73) Assignee: KRATON Polymers U.S. LLC, Houston, TX (US)

(*) Notice: Subject to any disclaimer, the term of this patent is extended or adjusted under 35 U.S.C. 154(b) by 0 days.

(21) Appl. No.: 09/525,137

(22) Filed: Mar. 14, 2000

Related U.S. Application Data
(60) Provisional application No. 60/130,786, filed on Apr. 23, 1999.

(51) Int. Cl.⁷ .............................. C08F 4/48; C08F 4/54
(52) U.S. Cl. .................. 526/173; 526/176; 526/177; 526/178
(58) Field of Search ................. 526/173, 176, 526/177, 178

(56) References Cited

U.S. PATENT DOCUMENTS

| | | | | |
|---|---|---|---|---|
| 3,278,508 A | * | 10/1966 | Kahle et al. | 260/94.3 |
| 3,631,006 A | | 12/1971 | Hawkins | 260/80.7 |
| 4,080,492 A | * | 3/1978 | de Zarauz | 526/177 |
| 4,429,090 A | | 1/1984 | Hall | 526/177 |
| 4,429,091 A | | 1/1984 | Hall | 526/181 |
| 4,473,661 A | | 9/1984 | Hall | 502/153 |
| 4,476,240 A | | 10/1984 | Hall et al. | 502/155 |
| 4,480,075 A | | 10/1984 | Willis | 525/247 |
| 4,518,753 A | | 5/1985 | Richards et al. | 526/177 |
| 4,520,123 A | | 5/1985 | Hall | 502/153 |
| 4,530,984 A | | 7/1985 | Hall | 526/177 |
| 4,591,624 A | | 5/1986 | Hall | 526/177 |
| 5,063,190 A | | 11/1991 | Hargis et al. | 502/157 |
| 5,202,499 A | | 4/1993 | Hargis et al. | 568/587 |
| 5,216,181 A | | 6/1993 | Hargis et al. | 549/513 |
| 5,331,058 A | | 7/1994 | Shepherd et al. | 525/332.3 |
| 5,376,745 A | | 12/1994 | Handlin, Jr. et al. | 526/178 |
| 5,397,851 A | | 3/1995 | Knauf et al. | 526/92 |
| 5,412,045 A | | 5/1995 | Osman et al. | 526/133 |
| 5,416,168 A | | 5/1995 | Willis et al. | 525/333.2 |
| 5,610,227 A | | 3/1997 | Antkowiak et al. | 524/572 |
| 5,665,827 A | | 9/1997 | Hall | 525/280 |
| 5,677,399 A | | 10/1997 | Hall | 526/83 |
| 5,700,888 A | | 12/1997 | Hall | 526/190 |
| 5,753,579 A | * | 5/1998 | Jalics et al. | 502/153 |
| 5,936,029 A | | 8/1999 | Hall | 524/572 |

FOREIGN PATENT DOCUMENTS

| | | | |
|---|---|---|---|
| WO | WO 97/33923 | 9/1997 | ............. C08F/4/50 |
| WO | WO 98/07765 | 2/1998 | ............ C08F/12/08 |
| WO | WO 98/07766 | 2/1998 | ......... C08F/212/04 |

OTHER PUBLICATIONS

"Solid-State NMY of Aromatic Polyamides," by S. A. Curran, C. P. LaClair, and S. M. Aharoni, *Macromolecules 1991*, 24, pp. 5903–5909.

"Towards the Control of the Reactivity in High Temperature Bulk Anionic Polymerization of Styrene, 1," by P. Desbois, M. Fontanille, A. Deffieux, V. Warzelhan, S. Latsch, C. Schade, *Marcromol. Chem. Phys. 200*, (1999) pp. 621–628.

"Controlled Anionic Polymerization of tert-Butyl Acrylate With Diphenylmethylpotassium in the Presence of Triethylborane," by T. Ishizone, K. Yoshimura, E. Yanase, and S. Nakahama, *Macromolecules 1999*, 32, pp. 955–957.

"Stereospecific Living Polymerization and Copolymerization of Methacrylate and Their Use for Construction of Stereoregular Chain Architecture," by K. Hatada, T. Kitayama, and K. Ute, *Makromol. Chem., Macromol. Symp. 70/71*, (1993) pp. 57–66.

"Identifying the Nature of the Active Species in the Polymerization of Methacrylates: Inhibition of Methyl Methacrylate Hompolymerizations and Reactivity Ratios for . . . ," by D. M. Haddleton, M. C. Crossman, K. H. Hunt, C. Topping, C. Waterson, and K. G. Suddaby, *Macromolecules 1997*, 30, pp. 3992–3998.

"Mechanism of Anionic Polymerization of (Meth)acrylates in the Presence of Aluminum Alkyls, 6. Polymerization of Primary and Tertiary Acrylates," by B. Schmitt, H. Schlaad, and A. H. E. Muller, *Macromolecules*, vol. 31, No. 6, Mar. 24, 1998, pp. 1705–1709.

* cited by examiner

*Primary Examiner*—David W. Wu
*Assistant Examiner*—Caixia Lu

(57) ABSTRACT

The present invention is an improvement in a method of anionically polymerizing monomers by contacting them with an anionic polymerization initiator which is an organo-substituted alkali metal compound in the presence of low amounts of an accelerator/promoter and/or a highly active microstructure modifier. The improvement comprises adding from 0.1 to 1.0 equivalents of a metal alkyl compound per equivalent of alkali metal initiator wherein alkyl groups of the metal alkyl compound are chosen so that they will not exchange with the organo substituents of the alkali metal compound. The preferred initiator for use herein is the sec-butyl lithium adduct of diisopropenyl benzene and the preferred metal alkyl is triethyl aluminum.

17 Claims, No Drawings

UNIFORM INITIATION OF ANIONIC POLYMERIZATION USING ORGANO-SUBSTITUTED ALKALI METAL INITIATORS

This application claims the benefit of U.S. Provisional Application No. 60/130,786, filed Apr. 23, 1999, the entire disclosure of which is hereby incorporated by reference.

FIELD OF THE INVENTION

This invention relates to the anionic polymerization of monomers utilizing organo-alkali metal initiators. More particularly, the invention relates to the uniform initiation of anionic polymerization for systems having little or no added accelerator/promoter and/or systems where a highly active structure modifier is used in relatively small amounts.

BACKGROUND OF THE INVENTION

Polymers of conjugated dienes and/or vinyl aromatic hydrocarbons have been produced by numerous methods. However, anionic polymerization of such monomers in the presence of an anionic polymerization initiator is a widely used commercial process. The polymerization is carried out in an inert solvent such as hexane, cyclohexane, or toluene and the polymerization initiator is commonly an organo-substituted alkali metal compound, especially aliphatic, cycloaliphatic, aromatic, and alkyl-substituted aromatic alkali metal compounds, and most especially alkyl lithium compounds such as sec-butyl lithium and n-butyl lithium. Another type of polymerization initiator, a protected functional initiator, has the structure

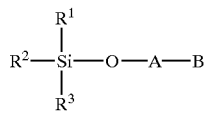

wherein $R^1$, $R^2$, and $R^3$ are independently selected from saturated and unsaturated aliphatic and aromatic radicals, A is a hydrocarbon bridging group containing from 1 to 25 carbon atoms, and B is an alkali metal. Other protected functional initiators with similar structures are known. Multifunctional organo-substituted alkali metal initiators are also used. For instance, a difunctional lithium initiator which is the sec-butyl lithium adduct of diisopropenylbenzene has been described in U.S. Pat. Nos. 5,554,696 and 5,750,055.

These anionic polymerizations are most often carried out in the presence of an accelerator/promoter for the polymerization process, such as diethyl ether. Alternatively, highly active microstructure modifiers such as diethoxypropane (DEP) or ortho-dimethoxybenzene (ODMB) are used to change the microstructure of the diene portion of the polymer produced. The most common initiators used in these processes have been sec-butyl lithium and n-butyl lithium and when they are used, with or without the accelerator/promoter or microstructure modifiers, the initiation of the polymerization proceeds very uniformly and at a reasonable rate. It has been found, however, that when other initiators are used and only low levels of accelerator/promoter or microstructure modifier are used, significant problems with the uniform initiation of the polymerization and with the rate of the polymerization are observed. For instance, when the sec-butyl lithium adduct of diisopropenylbenzene is used as a multifunctional initiator, problems with uniform initiation of polymerization are experienced when the accelerator/promoter (diethyl ether) is used in an amount of less than one equivalent of ether per equivalent of lithium initiator (in this case each molecule of initiator has two equivalents of lithium) and/or when the microstructure modifier (DEP or ODMB) is used in an amount wherein the molar ratio of modifier to lithium is less than 1:10.

It would be advantageous to provide a solution to this problem with initiation which did not involve the use of significant amounts of accelerator/promoter or microstructure modifier because both of those solutions promote the production of polymer with a high vinyl content. While having a high vinyl content in the polymer is often advantageous, it is not always the desired result and it would be advantageous to be able to achieve uniform initiation and still make a lower vinyl content polymer.

U.S. Pat. Nos. 5,554,696 and 5,750,055 describe one solution to this problem wherein the diinitiator is created in the presence of a tertiary amine and then is prereacted with a small amount of conjugated diene monomer to form a solution of a dilithio poly conjugated diene initiator. In the first patent, an aromatic ether activator is an additional component. The present invention provides an alternative solution to the problem which obviates the necessity of the tertiary amine, aromatic ether activator, and the prereaction step.

The term "vinyl content" refers to the fact that a conjugated diene is polymerized via 1,2-addition (in the case of butadiene—it would be 3,4-addition in the case of isoprene). Although a pure "vinyl" group is formed only in the case of 1,2-addition polymerization of 1,3-butadiene, the effects of 3,4-addition polymerization of isoprene (and similar addition for other conjugated dienes) on the final properties of the block copolymer will be similar. The term "vinyl" refers to the presence of a pendant vinyl group on the polymer chain. The purpose here is to introduce chain branching and to reduce the size of the main polymer backbone (since some of the carbons in the diene are in the pendant group) which reduces the end to end length of the molecule and, in turn, its viscosity in the cement.

SUMMARY OF THE INVENTION

The present invention is an improvement upon the known method of anionically polymerizing monomers by contacting the monomers with an anionic polymerization initiator which is an organo-substituted alkali metal compound in the presence of low amounts of an accelerator/promoter and/or a highly active microstructure modifier. The improvement comprises adding from 0.1 to 1.0, preferably 0.2 to 0.7, equivalents of a metal alkyl compound per equivalent of alkali metal initiator. The alkyl groups of the metal alkyl compound are chosen so that they will not exchange with the organo substituents of the alkali metal compound. Generally, this means that they are more basic and/or less bulky than the organo substituents of the alkali metal compound. The organo substituents of the alkali metal compound are aliphatic, cycloaliphatic, aromatic, or alkyl-substituted aromatic and include multi-functional initiators such as the sec-butyl lithium adduct of diisopropenyl benzene which is the preferred initiator for use herein. The preferred metal alkyl for use herein is triethyl aluminum.

DETAILED DESCRIPTION OF THE INVENTION

This invention relates to anionic polymers and processes for polymerizing them by anionic polymerization using mono- or di- or multi-alkali metal, generally lithium, initiators. Sodium or potassium initiators can also be used. For instance, polymers which can be made according the present invention are those from any anionically polymerizable monomer, including random and block copolymers with styrene, dienes, polyether polymers, polyester polymers, polycarbonate polymers, polystyrene, acrylics, methacrylics, etc. Polystyrene polymers hereunder can be made in the same manner as the polydiene polymers and can be random or block copolymers with dienes.

In general, when solution anionic techniques are used, copolymers of conjugated diolefins, optionally with vinyl aromatic hydrocarbons, are prepared by contacting the monomer or monomers to be polymerized simultaneously or sequentially with an anionic polymerization initiator such as group IA metals, their alkyls, amides, silanolates, naphthalides, biphenyls or anthracenyl derivatives. It is preferred to use an organo alkali metal (such as lithium or sodium or potassium) compound in a suitable solvent at a temperature within the range from about −150° C. to about 150° C., preferably at a temperature within the range from about −700° C. to about 100° C. Particularly effective anionic polymerization initiators are organo lithium compounds having the general formula:

$$RLi_n$$

wherein R is an aliphatic, cycloaliphatic, aromatic or alkyl-substituted aromatic hydrocarbon radical having from 1 to 20 about carbon atoms and n is an integer of 1 to 4. The organolithium initiators are preferred for polymerization at higher temperatures because of their increased stability at elevated temperatures.

Other initiators which can be used herein include multifunctional initiators. There are many multifunctional initiators that can be used herein. The di-sec-butyl lithium adduct of m-diisopropenyl benzene is preferred because of the relatively low cost of the reagents involved and the relative ease of preparation. Diphenyl ethylene, styrene, butadiene, and isoprene will all work well to form dilithium (or disodium) initiators by the reaction:

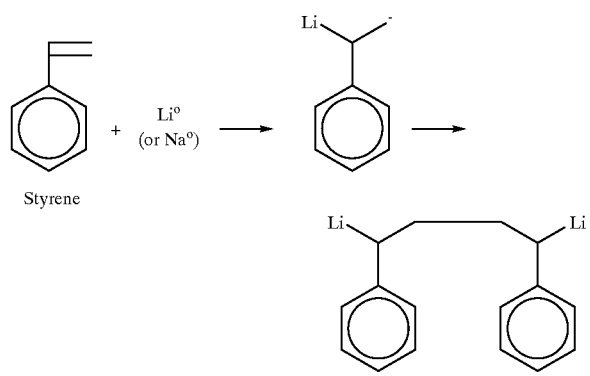

Still another compound which will form a diinitiator with an organo alkali metal such as lithium and will work herein is the adduct derived from the reaction of 1,3-bis(1-phenylethenyl)benzene (DDPE) with two equivalents of a lithium alkyl:

2RLi + 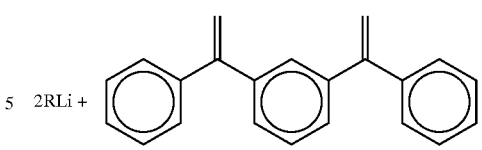

Related adducts which are also known to give effective dilithium initiators are derived from the 1,4-isomer of DDPE. In a similar way, it is known to make analogs of the DDPE species having alkyl substituents on the aromatic rings to enhance solubility of the lithium adducts. Related families of products which also make good dilithium initiators are derived from bis[4-(1-phenylethenyl)phenyl]ether, 4,4'-bis(1-phenylethenyl)-1,1'-biphenyl, and 2,2'-bis[4-(1-phenylethenyl)phenyl]propane (See L. H. Tung and G. Y. S. Lo, Macromolecules, 1994, 27, 1680–1684 (1994) and U.S. Pat. Nos. 4,172,100, 4,196,154, 4,182,818, and 4,196,153 which are herein incorporated by reference). Suitable lithium alkyls for making these dilithium initiators include the commercially available reagents (i.e., sec-butyl and n-butyl lithium) as well as anionic prepolymers of these reagents, polystyryl lithium, polybutadienyl lithium, polyisopreneyl lithium, and the like.

The polymerization is normally carried out at a temperature of 20 to 80° C. in a hydrocarbon solvent. Suitable solvents include straight and branched chain hydrocarbons such as pentane, hexane, octane and the like, as well as alkyl-substituted derivatives thereof; cycloaliphatic hydrocarbons such as cyclopentane, cyclohexane, cycloheptane and the like, as well as alkyl-substituted derivatives thereof; aromatic and alkyl-substituted derivatives thereof; aromatic and alkyl-substituted aromatic hydrocarbons such as benzene, naphthalene, toluene, xylene and the like; hydrogenated aromatic hydrocarbons such as tetralin, decalin and the like; linear and cyclic ethers such as dimethyl ether, methylethyl ether, diethyl ether, tetrahydrofuran and the like.

It is known to polymerize such polymers with multifunctional initiators and then cap the living chain ends with a capping agent such as described in U.S. Pat. Nos. 4,417,029, 4,518,753, and 4,753,991, which are herein incorporated by reference. When such polymers formed with multifunctional initiators are polymerized and then capped, a polymer gel often forms. It is the subject of an earlier invention to prevent the formation of such gel by the addition of a trialkyl aluminum compound during the polymerization/capping process. The present invention only relates to the improvement of the polymerization initiation when using initiators of the type described above under the conditions described above and does not relate to the prevention of polymer gels during the manufacture of capped polymers using multifunctional initiators.

For multifunctional initiators having bulky C—Li centers like the one shown below, it is not unusual to generate multiple polymer products from incomplete utilization of the initiator species during polymerization. C—Li centers are the points in the molecule of the initiator where the carbon-lithium bond is located and at which the propagation of the polymer chain begins and are sometimes also referred to herein as "chain ends" from which the polymer may continue to grow until it is terminated. As shown below, steric encumbrance at the active C—Li center may tend to slow the initiation reaction with the monomer. Di-initiation requires two sequential slow reactions (1 to 2 and 2 to 3). Once monomer has been added to the bulky C—Li center in the initiator, however, the chain end is no longer congested and addition of subsequent monomer is fast (conversion of 2 to 4). Unfortunately, polymerization from the mono-initiated moiety, product, 4, leads to "one armed" polymer. Formation of "two armed" polymer requires initiation from both centers, as in 3, and this is a slow process. The result of this competitive reaction process is that mixtures of "one-armed" and "two-armed" products are often formed. Multimodal products of this type are not preferred for applications where well defined (i.e., close to monomodal) polymers are required. This problem may be overcome by addition of a suitable metal alkyl that is capable of interacting with the initiated polymer to form an "ate" complex.

Route to Multimodal Polymer Products
Initiation of Polymerization from First Initiator Center.

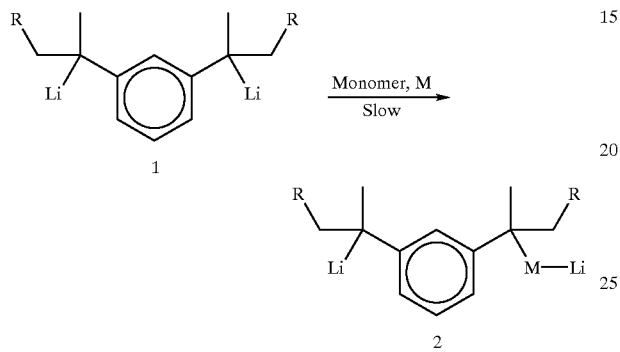

Initiation of Polymerization from Second Initiator Center.

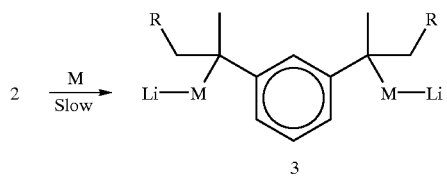

Polymerization from Mono-initiated Moiety.

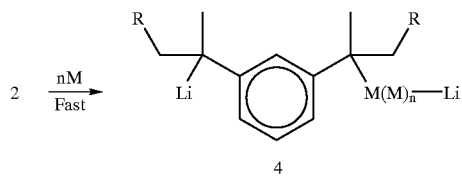

It is reasonable to expect that addition of a metal alkyl, like an aluminum alkyl, to a multifunctional initiator like 1 will result in the reversible formation of an ate-type adduct with the C—Li centers. Complexes like 5 are not capable of initiating polymerization of anionic monomers like styrene or a diene under standard conditions. Yet for conditions where the number of molar equivalents of metal alkyl present is less than the number of molar equivalents of C—Li centers (in the above example each mole of diiniator has two molar equivalents of C—Li centers) in the multi-functional initiator, there will still be "free" (not complexed) C—Li sites available to initiate the polymerization reaction.

Formation of an Aluminate Complex

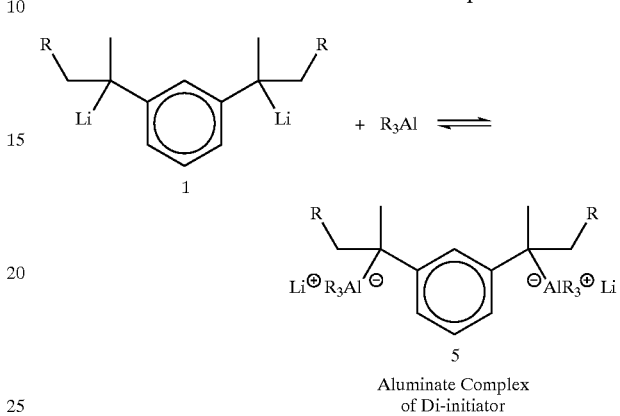

Aluminate Complex of Di-initiator

The rapid exchange of metal alkyl between the various C—Li centers outlined above is the major cause of the production of a monomodal distribution of polymer products. The redistribution of the metal alkyl between the various polymerization centers acts to regulate uniform polymerization at the various C—Li sites. The important redistribution reactions are outlined below where an aluminum alkyl is used to illustrate the exchange of a specific metal alkyl between C—Li centers. The addition of an aluminum alkyl to a C—Li center converts that center from one that is capable of adding an anionic polymerization monomer to one that is unreactive to such monomers. For this reason, the transfer of an aluminum alkyl from 5 to 2 or 3 regenerates an active polymerization center on the starting initiator species and it interrupts propagation at the already initiated site in 7 or 8. It is this action that interrupts the runaway polymerization at an already initiated center and avoids the formation of "one-armed" polymer as shown in 4. The rapid propagation reaction at an already initiated center is stopped by converting it to an aluminate complex. This allows other initiator centers to add monomer and become active propagation sites.

Exchange of Al Between C—Li Centers

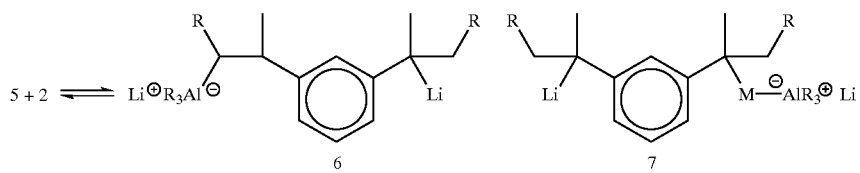

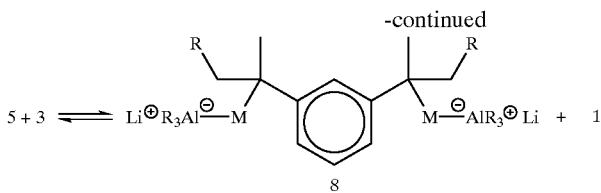

While the aluminate complexes are formed reversibly, the equilibrium likely favors having the least bulky alkyl on aluminum (a four coordinated center) leaving the more bulky alkyl on Li (a mono coordinated center). For examples where the C—Li center in the initiator species is more bulky than that in a propagating chain end (also referred to as "living" or non-terminated chain end), the alkyl preference between the two metal centers acts to favor the desired redistribution reaction. As long as both unreacted initiator centers and propagating chain ends are present in the polymerization solution, the aluminum alkyl will seek out the less sterically encumbered propagating chain ends, selectively react with them, and in this way deactivate them toward further polymerization of monomer. This action will interrupt the propagation reaction, allowing all of the initiator C—Li centers an opportunity to add monomer and participate in the polymerization reaction. When all of the C—Li centers have added monomer, all of the chain ends are of the same structure and there will be no reason for one type of chain end to be attached to the aluminum alkyl in preference to any other living chain end. At this point, rapid exchange of the aluminum alkyl between all of the living polymer chain ends will allow polymerization at all C—Li centers and uniform production of "two-armed" polymer will proceed.

The selection of the alkyl, R, on the metal center is important for the effective use of metal alkyls for the improvement of initiation behavior for sterically encumbered initiators. As the formation of the metal ate complex is reversible, R groups must be selected which are not prone to dissociation from the complex to form RLi molecules, i.e., they must not exchange with the organo substituent of the lithium. As shown below using an aluminum alkyl for illustrative purposes, dissociation of the aluminate complex to form RLi and an aluminum alkyl attached to the polymer chain end is effectively a chain transfer mechanism for the polymerization reaction.

Undesired "Chain Transfer" Reaction

The living polymerization center, a C—Li moiety, has been transferred from the end of the polymer chain to the alkyl that was originally on the aluminum species. The polymer-aluminum alkyl moiety will be inactive under typical conditions for anionic polymerization of monomers and thus, this polymer chain is essentially "dead" for purposes of additional polymerization reactions. If the newly formed RLi species is not an effective initiator for polymerization of anionic monomers, the consequence of this reaction will be to stop the consumption of monomer and terminate polymerization. If, on the other hand, the newly formed RLi species is an effective polymerization initiator, this reaction provides a route to generation of a new anionic polymer, one not attached to the starting polymer chain.

When it is desired to make block copolymers having well defined structures, all of these reactions are undesirable. Chain transfer processes like those described above interfere with the orderly process of sequential addition of monomers normally used for making well defined block copolymers with living polymerization systems. For such processes, it is desirable to minimize or eliminate these side reactions. It is desirable then to select R groups on the metal alkyls being used to improve the initiation characteristics of the sterically encumbered lithium alkyl such that the reaction to form new RLi moieties is minimized and preferably avoided.

At equilibrium, alkyl groups that are more basic will favor being attached to the more electro-negative metal, in the metal alkyl. Less basic alkyls will favor being attached to the more electropositive metal, in the alkali metal alkyl. The more electro-negative metal is better able to stabilize the charge of a strongly basic alkyl anion. Consider the example shown below for the distribution of alkyl groups R and R' between lithium and aluminum centers:

Distribution of Alkyl Groups Between Li and Al Centers

The selection rule for whether RLi or R' Li is the predominant unassociated lithium alkyl species present at equilibrium depends, in part, on which alkyl is more basic. The basicity of alkyl moieties has been shown to follow the general trend outlined below:

Selection Rule for the Distribution of Alkyl Centers Between Li and Al

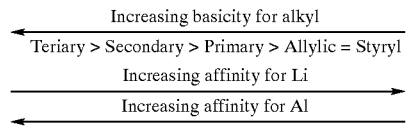

Also, as discussed above, in a competition for the two metal centers, it is reasonable to expect that more bulky alkyls will prefer to be attached to the monofunctional lithium center while less sterically encumbered alkyls will select the more highly substituted aluminum center.

A preferred embodiment of this invention is the case where a living polymer derived from the anionic polymerization of styrene or diene (styryl-lithium or allyl-lithium chain end) is treated with triethylaluminum (primary alkyl group). Formation of the ate complex should be facile but exchange of alkyls between the metal centers is not favored. The least basic and more bulky alkyl group, styryl-lithium or allyl-lithium, will stay on lithium while the more basic and less sterically encumbered alkyl, ethyl, will have an affinity for the aluminum center. This is a preferred system for enhancing the initiation characteristics of sterically encumbered lithium alkyls. Of course, aluminum alkyls having secondary or tertiary alkyls should work as well.

Conversely, treatment of the currently commonly used sec-butyllithium (secondary alkyl) or n-butyllithium (primary alkyl) polymerization initiators with triethylaluminum (primary alkyl) followed by addition of monomer should not be an effective polymerization system under the conditions of this invention (low levels of accelerator/promoter and/or microstructure modifier). This hypothesis was tested as outlined in the following comparative example. As the ratio of triethylaluminum to sec-butyllithium was increased, the efficiency of the system for the initiation of the polymerization of styrene was reduced until at 1 mole of triethylaluminum for each mole of sec-butyllithium, the system was not able to initiate the polymerization of styrene or the rate of reaction was very slow. For this combination of alkyls, the more basic alkyl, sec-butyl, should have an affinity for Al while the less basic primary alkyl, ethyl, would be expected to favor the lithium center. As ethyllithium is an ineffective initiator of styrene polymerization, the alkyl exchange reaction has worked to remove the only effective polymerization initiator in the system, sec-butyllithium. When a molar equivalent of triethylaluminum has been added, all of the sec-butyllithium has been converted to ethyllithium which is inactive as a polymerization initiator.

While this technology has been illustrated using a diinitiator example, it is expected that this technique will work to improve the uniformity of the distribution of molecular weight in any anionic polymer prepared from a sterically hindered initiator. It should work for monofunctional or multifunctional initiators and for protected functional initiators. It should work when a multifunctional initiator is used to polymerize an anionic polymer which is capped to form a functionalized polymer.

If a metal alkyl is added to a bulky lithium alkyl to improve the uniform initiation of polymerization of an anionic monomer and chain transfer reactions are to be avoided, addition of any metal alkyl that is prone to the formation of "ate" complexes on addition to the polymer cement and which has alkyl substituents that are not prone to exchange will likely work. Alkyls of aluminum, zinc, boron (especially trialkyls such as triethylborane), and magnesium, and combinations thereof, should all be effective for this purpose. Preferably, the alkyls have from 1 to 20 carbon atoms per alkyl substituent. Preferably, the metal alkyl is selected from the group consisting of trialkyl aluminum, dialkyl magnesium, and dialkyl zinc compounds. Preferred trialkylaluminum compounds are triethylaluminum, trimethylaluminum, tri-n-propylaluminum, tri-n-butylaluminum, triisobutylaluminum, tri-n-hexylaluminum, and trioctylaluminum because these reagents are readily available in commercial quantities. Triethylaluminum is most preferred as it is least expensive on a molar basis. Preferred dialkylmagnesium compounds are butylethylmagnesium, di-n-butylmagnesium, and di-n-hexylmagnesium because these reagents are readily available in commercial quantitites. Preferred dialkylzinc compounds are dimethylzinc, diethylzinc, di-n-propylzinc, diisobutylzinc, and di-n-butylzinc because these reagents are readily available in commercial quantities.

Most of the improved effect on the initiator from the addition of the metal alkyl will have been realized when the molar ratio of metal alkyl to C—Li polymer chain end is less than 1. Higher levels of metal alkyl will afford little additional effect and will slow the polymerization reaction. At least 0.1 molar equivalents of the metal alkyl per equivalent of alkali metal initiator (C—Li polymer chain end) should be used in order to achieve a measurable advantage. The preferred range of operation is 0.2 to 0.7.

In the absence of the claimed metal alkyls or significant amounts of accelerator/promoter, such as diethyl ether or other known ethers, or microstructure modifier, such as tetrahydrofuran, diethoxypropane, or ortho-dimethoxybenzene, polymerization initiation is ineffective and/or not uniform. Use of metal alkyls as described herein is a solution to this problem but the initiation problems do not occur when accelerator/promoters or microstructure modifiers are to be used. However, even though initiation problems are not experienced, the metal alkyls will still act in the manner described above, i.e., form the organometallic complexes/compounds and metal alkyl adduct living polymers described above.

EXAMPLES

Comparative Example 1

A polybutadiene homopolymer was synthesized using a difunctional initiator (diinitiator) which had been prepared by the addition of 2 equivalents of s-BuLi to 1,3-diisopropenylbenzene (DIPB) (see structure 1). The diinitiator solution contained a small amount of diethyl ether that was necessary for the synthesis of the diinitiator. The actual diethyl ether content of this polymerization was low, about one equivalent of ether for each equivalent of lithium alkyl present in the reaction. As this experiment was for use as a comparative example, no metal alkyl was added to the polymerization to enhance the efficiency of the initiation of polymerization. When the product was analyzed using a standard gel permeation chromatography (GPC) technique, a bimodal distribution of molecular weight products was observed. Due to poor initiation of polymerization, a mixture of "two armed" and "one armed" products was formed.

To a clean, 1 gallon, stainless steel, stirred autoclave, 0.58 gal (1711 grams) of cyclohexane was charged from a pressure vessel under nitrogen. The autoclave was controlled at about 40° C., using a circulating temperature bath that supplied water to the jacket of the autoclave. Under nitrogen, 200 grams of polymerization grade butadiene was added to the reactor. The temperature of the reactor was allowed to stabilize. 98.97 grams of a diinitiator solution containing 0.114 moles of active carbon-lithium were added to initiate polymerization. The diinitiator was made using sec-butyllithium and 1,3-diisopropenylbenzene in cyclohexane and contained 9.47% weight diethyl ether. This afforded only 0.47% diethyl ether in the polymerization solution. After charging the diinitiator, the temperature of the polymerization was maintained at approximately 40° C. (range 34.1–42.2° C.) for 40 minutes. The living polymer solution was treated with an excess of ethylene oxide to functionalize the living polymer chain ends. The polymer solution was washed with 500 grams of 40% aqueous phosphoric acid at 50° C. in a jacketed, stirred glass reactor at 600–700 rpm stirring rate for 20–30 minutes. The polymer product was analyzed by gel permeation chromatography (GPC). The GPC analysis revealed a bimodal molecular weight distribution. The overall number average molecular weight ($M_n$) of the polymer was 2954. The higher molecular weight component had a molecular weight of about 3384 (two armed polymer) and the lower about 1103 (one armed polymer). The product was low in vinyl content. About 32% of the butadiene had been polymerized by 1,2-addition.

Example 1

A polybutadiene homopolymer was synthesized using a difunctional initiator (diinitiator) which had been prepared by the addition of 2 equivalents of s-BuLi to 1,3-diisopropenylbenzene (DIPB) (see structure 1). The diinitiator solution contained a small amount of diethyl ether that was necessary for the synthesis of the diinitiator. The actual diethyl ether content of this polymerization was low, about one equivalent of ether for each equivalent of lithium alkyl present in the reaction. This experiment differed from Comparative Example 1 in that half an equivalent of metal alkyl (triethylaluminum (TEA)) for each C—Li center in the initiator was added to the polymerization to enhance the efficiency of the initiation of polymerization. The TEA was added to the initiator before monomer was added. When the polymer product was analyzed using a standard gel permeation chromatography (GPC) technique, a mono-modal distribution of molecular weight product was observed. Due to the improved initiation of polymerization, apparently only "two armed" product was formed.

To a clean, 1 gallon, stainless steel, stirred autoclave, 0.57 gal (1681 grams) of cyclohexane was charged from a pressure vessel under nitrogen. The autoclave was controlled at about 40° C. using a circulating temperature bath that supplied water to the jacket of the autoclave. Under nitrogen, 200 grams of polymerization grade butadiene was added to the reactor. The temperature of the reactor was allowed to stabilize. 26.3 grams of 25% hexane solution of TEA (0.057 mole) (the initiation of polymerization promoter) were added. Quickly following the addition of TEA, 99.35 grams of a diinitiator solution containing 0.114 moles of active carbon-lithium was charged to the vessel. The diinitiator was the same as used in Comparative Example 1. After charging the diinitiator, the temperature of the polymerization was kept at approximately 40° C. (range 34–42.8° C.) for 180 minutes. The living polymer solution was treated with an excess of ethylene oxide to functionalize the living polymer chain ends. The product solution was washed with aqueous acid as described in Comparative Example 1. The molecular weight of the polymer product was analyzed both by GPC and by a proton NMR technique. The GPC analysis revealed a monomodal molecular weight distribution with an Mn of 3064. The proton NMR analysis revealed an Mn of 3400. A "two armed" polymer product was formed as a consequence of the addition of half an equivalent of TEA (basis C—Li ). The product polymer was low in vinyl content. About 24% of the butadiene had been polymerized by 1,2-addition.

Example 2

The process of Example 1 was repeated. The product of the TEA modified polymerization was analyzed using the GPC and proton NMR methods as described above. The GPC analysis revealed a product with a monomodal molecular weight distribution with an Mn of 4903. The proton NMR analysis revealed an Mn of 3781. A "two armed" polymer product was formed as a consequence of the addition of half an equivalent of TEA (basis C—Li ) to the polymerization. The product polymer was low in vinyl content. About 22% of the butadiene had been polymerized by 1,2-addition.

We claim:

1. In a method of anionically polymerizing monomers comprising contacting the monomers with a functional anionic polymerization initiator which is an organo-substituted alkali metal compound, the improvement which comprises adding from 0.1 to 1.0 equivalents of a metal alkyl compound per equivalent of the alkali metal compound wherein alkyl groups of the metal alkyl compound are chosen so that they will not exchange with the organo substituents of the alkali metal compound and wherein the organo substitution of the alkali metal compound is aliphatic, cycloaliphatic, aromatic, or alkyl-substituted aromatic.

2. The method of claim 1 wherein the initiator is a diinitiator.

3. The method of claim 1 wherein the metal alkyl compound is selected from the group consisting of aluminum, zinc, boron, and magnesium alkyls having from 1 to 20 carbon atoms per alkyl substituent.

4. The process of claim 3 wherein the metal alkyl compound is selected from the group consisting of triethylaluminum, trimethylaluminum, tri-n-propylaluminum, tri-n-butylaluminum, triisobutylaluminum, tri-n-hexylaluminum, trioctylaluminum, butylethyl-magnesium, di-n-butylmagnesium, di-n-hexylmagnesium, dimethylzinc, diethylzinc, di-n-propylzinc, diisobutylzinc, and di-n-butylzinc.

5. The process of claim 4 wherein the metal alkyl compound is triethyl aluminum.

6. The method of claim 1 further comprising less than one equivalent of an accelerator/promoter per equivalent of the anionic polymerization initiator.

7. The process of claim 1 wherein from 0.2 to 0.7 equivalents of the metal alkyl compound are added per equivalent of the alkali metal compound.

8. The process of claim 1 wherein alkyl groups of the metal alkyl compound are more basic and/or less bulky than the organo substituents of the alkali metal compound.

9. The process of claim 1 further comprising adding a microstructure modifier at a modifier: initiator molar ratio less than 1:10.

10. A process of anionically polymerizing monomers, comprising;

adding a metal alkyl compound to a functional anionic polymerization initiator which is an organo-substituted alkali metal compound, wherein 0.1 to 1.0 equivalents of the metal alkyl compound are added per equivalent of the alkali metal compound and. alkyl groups of the metal alkyl compound are chosen so that they will not exchange with the organo substituents of the alkali metal compound, and wherein the alkali metal compound is the sec-butyl lithium adduct of diisopropenyl benzene; and polymerizing the monomers with the initiator.

11. The process of claim 10 wherein the alkyl groups of the metal alkyl compound are more basic and/or less bulky than the organo substituents of the alkali metal compound.

12. The process of claim 10 wherein the metal alkyl compound is selected from the group consisting of aluminum, zinc, boron, and magnesium alkyls having from 1 to 20 carbon atoms per alkyl substituent.

13. The process of claim 12 wherein the metal alkyl compound is selected from the group consisting of triethylaluminum, trimethylaluminum, tri-n-propylaluminum, tri-n-butylaluminum, triisobutylaluminum, tri-n-hexylaluminum, troctylaluminum, butylethyl-magnesium, di-n-butylmagnesium, di-n-hexylmagnesium, dimethylzinc, diethylzinc, di-n-propylzinc, diisobutylzinc, and di-n-butylzinc.

14. The process of claim 13 wherein the metal alkyl compound is triethyl aluminum.

15. In a method of anionically polymerizing monomers comprising contacting the monomers with a functional anionic polymerization diinitator which is an organo-substituted alkali metal compound, the improvement which comprises adding from 0.1 to 1.0 equivalents of a metal alkyl compound per equivalent of the alkali metal compound wherein alkyl groups of the metal alkyl compound are chosen so that they will not exchange with the organo substituents of the alkali metal compound, and wherein the alkali metal compound is a sec-butyl lithium adduct of diisopropenyl benzene.

16. The method of claim 15 wherein the metal alkyl compound is triethyl aluminum.

17. The method of claim 16, further comprising adding a microstructure modifier at a modifier: initiator molar ratio less than 1:10.

* * * * *

UNITED STATES PATENT AND TRADEMARK OFFICE
CERTIFICATE OF CORRECTION

PATENT NO.    : 6,455,651 B1
DATED         : September 24, 2002
INVENTOR(S)   : Carl Lesley Willis et al.

It is certified that error appears in the above-identified patent and that said Letters Patent is hereby corrected as shown below:

Column 3,
Line 1, please change -- to -- before "the present".
Line 22, please change "-700º C." to -- -70º C. --.

Column 8,
Line 32, please change "RLI" to -- RLi --.
Line 45, please change "Teriary" to -- Tertiary --.

Column 9,
Line 34, please change "bulky" to -- butyl --.
Line 56, please change "quantitites" to -- quantities --.

Column 13,
Line 7, please change "dilsopropenyl" to -- diisopropenyl --.

Signed and Sealed this

Fourth Day of March, 2003

JAMES E. ROGAN
*Director of the United States Patent and Trademark Office*